United States Patent
Shapira et al.

(10) Patent No.: US 12,541,548 B1
(45) Date of Patent: Feb. 3, 2026

(54) SYSTEMS AND METHODS FOR CONSOLIDATING ACCOUNTS IN AN ORGANIZATION

(71) Applicant: Recolabs Ltd, Tel Aviv (IL)

(72) Inventors: Tal Shapira, Tel-Aviv (IL); Eyal Asulin, Tel Aviv-Jaffa (IL)

(73) Assignee: RECOLABS LTD, Tel Aviv (IL)

( * ) Notice: Subject to any disclaimer, the term of this patent is extended or adjusted under 35 U.S.C. 154(b) by 0 days.

(21) Appl. No.: 18/938,470

(22) Filed: Nov. 6, 2024

(51) Int. Cl.
| *G06F 16/30* | (2019.01) |
| *G06F 16/334* | (2025.01) |
| *G06F 16/335* | (2019.01) |
| *G06F 16/353* | (2025.01) |
| *G06F 40/295* | (2020.01) |

(52) U.S. Cl.
CPC ........ *G06F 16/353* (2019.01); *G06F 16/3344* (2019.01); *G06F 16/335* (2019.01); *G06F 40/295* (2020.01)

(58) Field of Classification Search
CPC .. G06F 16/3344; G06F 16/335; G06F 16/353; G06F 40/295
See application file for complete search history.

(56) References Cited

U.S. PATENT DOCUMENTS

| 11,537,627 | B1* | 12/2022 | Baskaran | G06F 16/951 |
| 2021/0026897 | A1* | 1/2021 | Rathje | G06F 16/90332 |
| 2021/0288990 | A1* | 9/2021 | Kao | H04L 67/125 |
| 2022/0075788 | A1* | 3/2022 | Kalou | G06F 16/9035 |
| 2022/0222327 | A1* | 7/2022 | Im | G06F 11/3438 |
| 2022/0309166 | A1* | 9/2022 | Shenoy | G06F 21/577 |
| 2024/0020340 | A1* | 1/2024 | Joshi | G06N 3/088 |
| 2024/0098106 | A1* | 3/2024 | Allen | G06F 21/55 |
| 2024/0356959 | A1* | 10/2024 | Jeyakumar | H04L 63/1416 |

* cited by examiner

*Primary Examiner* — Diedra McQuitery
(74) *Attorney, Agent, or Firm* — PEARL COHEN ZEDEK LATZER BARATZ LLP

(57) ABSTRACT

A method for consolidating accounts in an organization, the method comprises: collecting a list of accounts used in applications operated by an organization; identifying clusters of candidates accounts that belong to a single entity in the organization; computing a similarity score between the clusters of the candidates of accounts to identify accounts with mutual features that relate to the specific entity; adding the accounts with mutual features that relate to the specific entity to a list of known accounts that relate to the specific entity.

14 Claims, 5 Drawing Sheets

SYSTEMS AND METHODS FOR CONSOLIDATING ACCOUNTS IN AN ORGANIZATION

FIELD

The invention, in some embodiments thereof, relates to usage of applications operating in organizations and, more specifically, but not exclusively, to systems and methods for consolidating accounts usage of applications in organizations.

BACKGROUND

Enterprises use internet-based services, such as Office365, Box, Salesforce, Slack and others, to improve the organization's productivity, collaboration and business application workloads. Organizations face difficulties in monitoring which persons/entities in the organization use which application.

SUMMARY

In one aspect of the invention a method is provided for consolidating accounts in an organization, the method including collecting a list of accounts used in applications operated by an organization, identifying clusters of candidates accounts that belong to a single entity in the organization, computing a similarity score between the clusters of the candidates of accounts to identify accounts with mutual features that relate to the specific entity, adding the accounts with mutual features that relate to the specific entity to a list of known accounts that relate to the specific entity.

In some cases, the method further comprises filtering accounts that were not extracted during a specific time frame from the list of candidates.

In some cases, the entity is selected from a group consisting identities, users, persons, services, physical devices, and virtual machines. In some cases, computing the similarity score comprises extracting the information about the candidates of accounts by collecting information from an organizational database. In some cases, the extracting comprises identifying full names of the entities. In some cases, the extracting comprises identifying email prefixes of the entities.

In some cases, computing the similarity score is performed using a computerized language model. In some cases, in case the accounts with mutual features relate to multiple entities in the organization, the method further comprises merging the multiple entities into one entity. In some cases, in case the accounts in the cluster of accounts do not relate to a single entity in the organization, the method further comprises adding a new entity in the organization's database. In some cases, clustering is performed by a technique selected from K-means, DB scan, alphabetic edit distance, distance between strings and a combination thereof.

In some cases, the method further comprises detecting a deviation event in which a behavior of one account associated with an entity differs from a normal behavior of other accounts of the entity. In some cases, the deviation event is defined according to a location of accessing the account. In some cases, the deviation event is defined according to a time of accessing the account. In some cases, the deviation event is defined according to using a first account not correlated with activity in another account of the entity.

In some cases, the method further comprises comparing events belonging to a specific account related to a specific entity and events that belong to other accounts relate to the same entity. In some cases, the method further comprises identifying activity of accounts that belong to a former employee in the organization. In some cases, the method further comprises identifying that a former employee of the organization has access to active accounts of the organization.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

At least some implementations described herein address the technical problem of monitoring usage of accounts in applications in an organization. The monitoring may be required to identify which applications are used by each entity, identify abnormal usage of accounts which may indicate a security breach, identify lack of usage in applications, identify which business units access each application and the like.

The technical solution is a computing system and method configured to identify which accounts belong to each organizational entity.

Figure 1A:
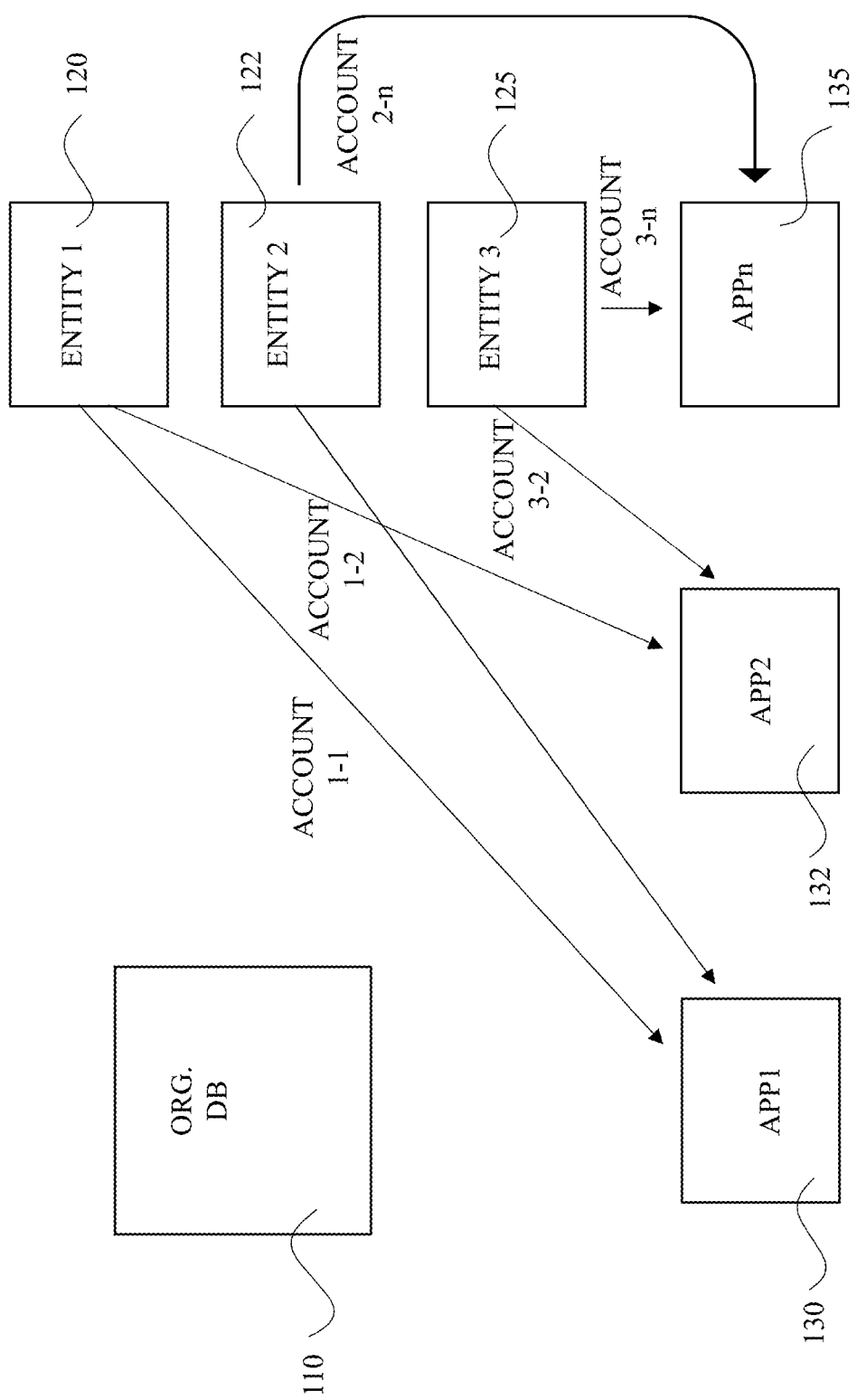
FIG. 1A shows entities, applications, and a server configured to consolidate accounts in an organization, in accordance with some embodiments of the invention.

FIG. 1A shows user entities, applications, and a server configured to consolidate accounts in an organization, in accordance with some embodiments of the invention. The user entities 120, 122, 125 create accounts to access computerized applications 130, 132, 135, for example using electronic devices such as laptop computers, cellular phones, tablet computers, personal computers and the like. The user entities 120, 122, 125 may request access to the computerized applications 130, 132, 135 via one or more IDPs (Google Workspace, Microsoft, Okta, and the like). In some cases, multiple users operate in a single user device and input identifiers such as an email address and a password. This way, multiple users or other types of entities may access a specific application from the same device.

The entities 120, 122 and 125 access the applications 130, 132, 135 using accounts. That is, each entity is required to create an account for the applications he/she uses. For example, entity 120 uses account 1-1 when using application 130, account 1-2 when using application 132. Similarly, entity 122 uses account 2-n when using application 135, and entity 125 uses account 3-n when using application 135.

Server 110 is configured to collect usage information on the applications 130, 132, 135 and identify whether or not user identities 120, 122 and 125 access the applications in a non-provisioned manner, without using the IDPs. In some cases, identifying non-provisioned usage may be performed when a specific application receives a request to access the application, in some other cases, the process of identifying non-provisioned usage is done periodically, for example once a week. Identifying non-provisioned usage is also named as using a local account, as opposed to a provisioned account.

Figure 1B:
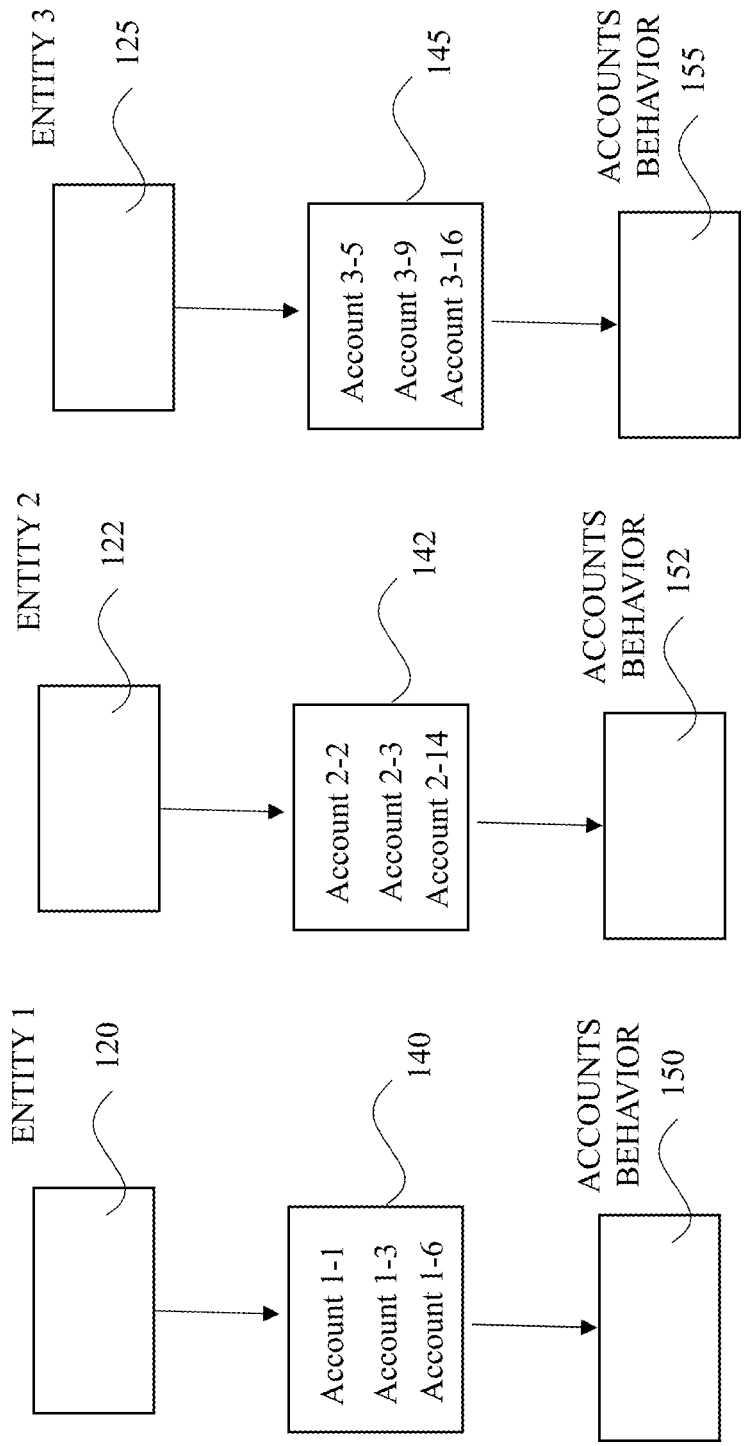
FIG. 1B schematically shows a database holding data records on entities, accounts and accounts behavior, in accordance with some embodiments of the invention.

FIG. 1B schematically shows a database holding data records on entities, accounts and accounts behavior, in accordance with some embodiments of the invention. Different entities in the organization use different applications, such as Jira, Slack, software programming tools, financing tools, legal tools, marketing tools and the like. For example, entity 120 uses applications included in list 140, entity 122 uses applications included in list 142 and entity 125 uses applications included in list 145. The applications in the lists are denoted with two characters—the first "1" indicating an identifier of the entity and the second "1" indicating the application identifier. As such, in the given example, entity 120 uses applications #1, #3 and #6 via accounts 1-1, 1-3 and 1-6, respectively. Similarly, entity 122 uses applications #2, #3 and #14 via accounts 2-2, 2-3 and 2-14, respectively and entity 125 uses applications #5, #9 and #16 via accounts 3-5, 3-9 and 3-16, respectively. FIG. 1B also shows behavior patterns for each of the accounts of each entity. The behavior patterns may be computed according to events and/or interactions between the account and the application the account uses, as well as additional parameters such as geolocation of login, language used, information extracted from text or other input from the account and the like. The behavior patterns of storage 150 include behavior of the accounts of entity 120, behavior patterns of storage 152 include behavior of the accounts of entity 122 and behavior patterns of storage 150 include behavior of the accounts of entity 120.

Figure 2:
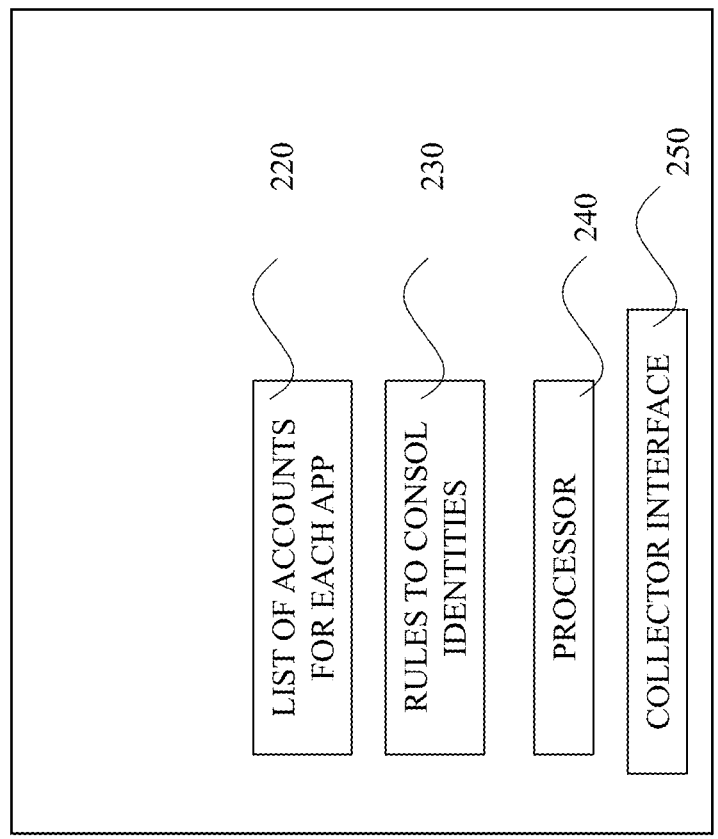
FIG. 2 shows a computing system configured to consolidate accounts in an organization, in accordance with some embodiments of the invention.

FIG. 2 shows a computing system configured to identify non-provisioned usage of applications in an organization, in accordance with some embodiments of the invention. In various embodiments, the computing system described herein performs a specific process to identify non-provisioned usage of applications in an organization described in greater detail herein. In certain embodiments, identifying non-provisioned usage enables applying security policies on relevant entities or users, hence improving the organization's data security. Once the computing system is configured to perform the process of identifying non-provisioned usage, the computing system may identify abnormal usage of a specific application used by a specific entity, compared to the usage of other applications by the specific entity.

The computing system comprises a processor 240 configured to manage the processes performed by the computing system. The processor 240 may be any one or more processors such as a Central Processing Unit (CPU), a microprocessor, an electronic circuit, an Integrated Circuit (IC), or the like. The processor 240 may be utilized to perform computations required by the computing system or any of its subcomponents.

The computing system may also comprise a collector interface 250 configured to collect information from resources used by entities of the organization. The entities may include one or more IDPs (Google Workspace, Microsoft, Okta, and the like), incoming email messages, APIs operated and/or managed by the software applications, operation logs of the organization, and the like. The information received via the collector interface 250 comprises instances of using the applications by the organizational entities.

The computing system comprises a memory configured to store rules and organizational information. The memory may be a hard disk drive, a Flash disk, a Random Access Memory (RAM), a memory chip, or the like. In some exemplary embodiments, memory can retain program code operative to cause processor 240 to perform acts associated with any of the subcomponents of the computing system.

The memory comprises a list of accounts for each application 220. The applications are operated by entities that create accounts, for example via email addresses.

The memory comprises rules required to perform entity consolidation processes 230 elaborated in FIGS. 3-4 below.

Figure 3:
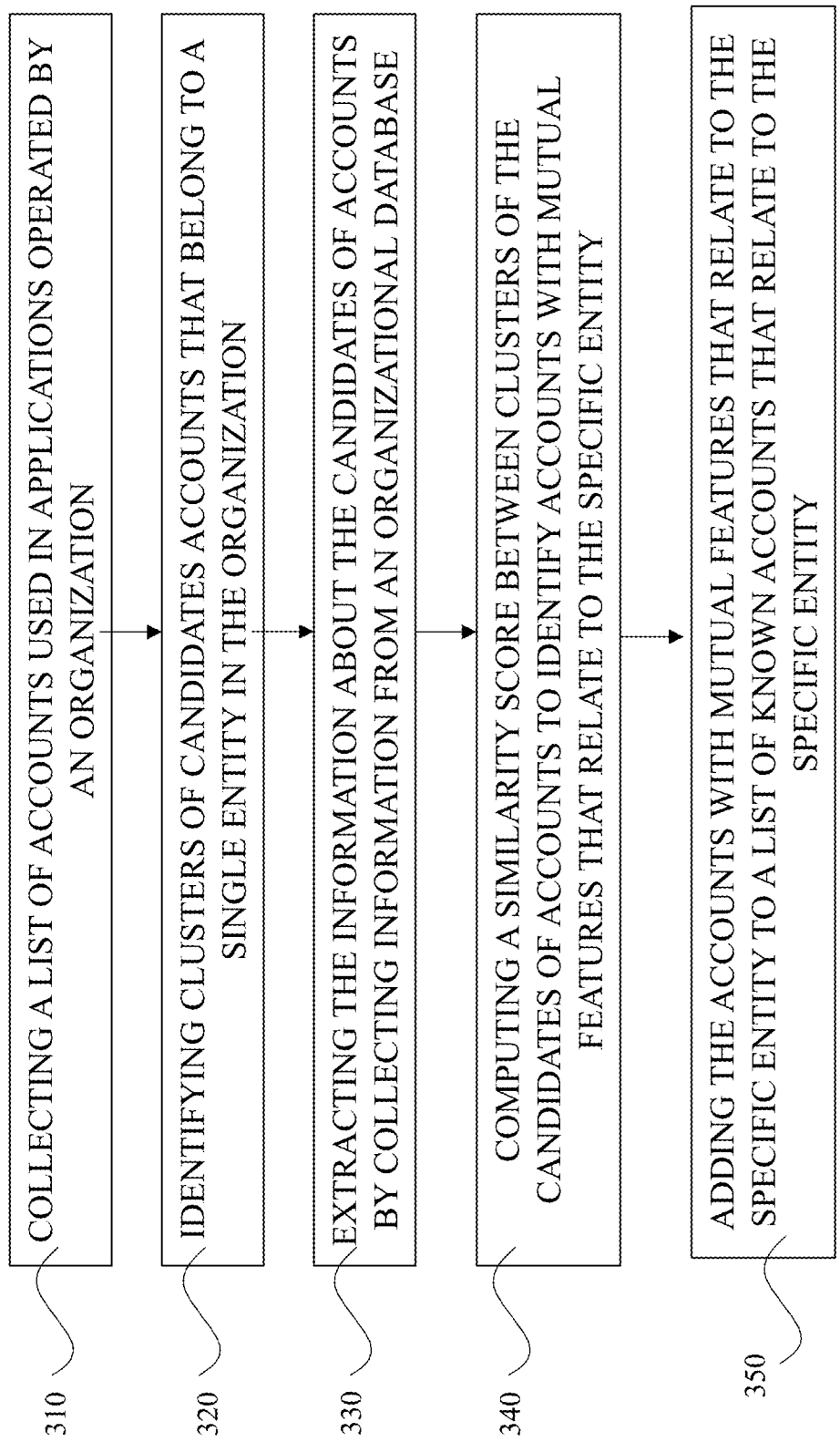
FIG. 3 shows a method for configured to consolidate accounts in an organization, in accordance with some embodiments of the invention.

FIG. 3 shows a flowchart of a method of identifying accounts operated by a specific entity in an organization, in accordance with some embodiments of the invention.

Step 310 discloses collecting a list of accounts used in applications operated by an organization. The list of accounts have a main identifier, for example an email address used by the entity to activate the account, and metadata.

Step 320 discloses identifying clusters of candidates accounts that belong to a single entity in the organization. The candidates are clustered using a clustering process that receives as input identifier and additional metadata, such as strings-username, email address and the like. For example, when processing a batch of 2,000 accounts, the output of the clustering process will be clusters of accounts and identifiers of the accounts, for example a numeric value, such as cluster #1 of candidate accounts include accounts #102, #374 and #872, cluster #2 of candidate accounts include accounts #402, #524, #130, #371 and #692 and the like. The clustering techniques used to identifying clusters of candidates accounts may be selected by a person skilled in the art, for example k-means, alphabetic, distance between strings and the like. The clusters may be identified by sorting or filtering the accounts according to primary identifier such as email address or prefix of email address.

Step 330 discloses extracting the information about the candidates of accounts by collecting information from an organizational database. Extracting the information may include full names of the entities, email prefixes of the entities and the like.

Step 340 discloses computing a similarity score between the clusters of the candidate accounts to identify accounts with mutual features that relate to the specific entity. The similarity score is done between the candidate accounts and at least some of the entities. The output of the comparison may be 1. Matching the cluster of candidate accounts to an existing entity in the organizational database. 2. Requirement to add a new entity in the organizational database, for example in case the output of the similarity score is lower than a threshold. Computing the similarity score may be done using an embedding model or using another component or technique desired by a person skilled in the art. The invention also discloses merging entities in case the two or more entities have a similarity score that is higher than a threshold.

Step 350 discloses adding the accounts with mutual features that relate to the specific entity to a list of known accounts that relate to the specific entity.

Figure 4:
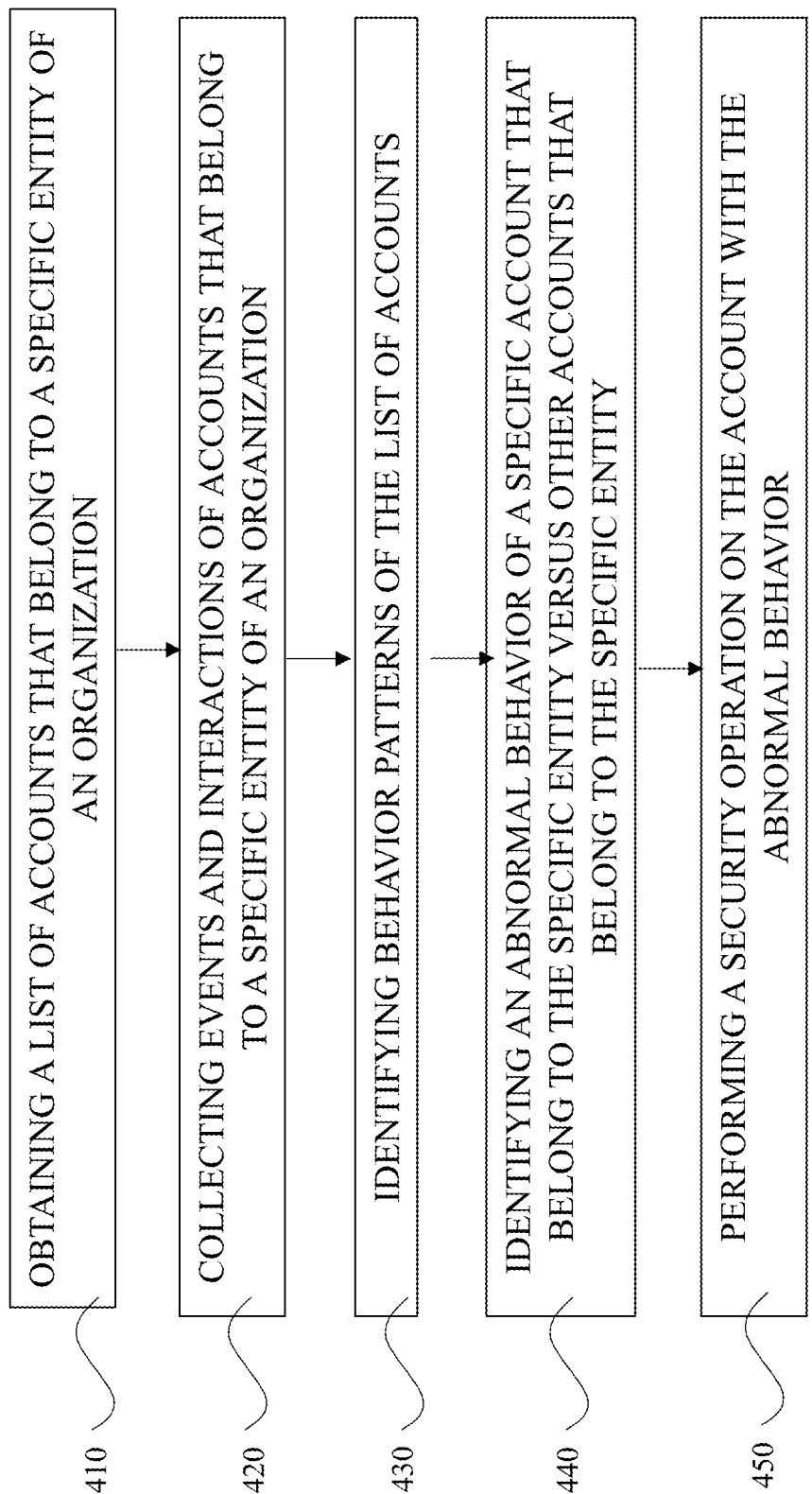
FIG. 4 shows a method for configured to abnormal usage among accounts in an organization, according to exemplary embodiments of the invention.

FIG. 4 shows a method for identifying abnormal behavior in a specific account used by an organizational entity, according to exemplary embodiments of the invention.

Step 410 discloses obtaining a list of accounts that belong to a specific entity of an organization. In standard operation, many entities in the organization are associated with a set of accounts, each account is used to access a different application, the list of accounts may be stored in the organizational server or in another memory storage accessible to the organization, for example using a cloud computing service such as AWS, google cloud and the like.

Step 420 discloses collecting events and interactions of accounts that belong to a specific entity of an organization. The events may be activating the application, inputting information or commands into the application, logging into the application and the like. The events also include metadata of the events, for example start time, duration, IP address, geolocation and the like.

Step 430 discloses identifying behavior patterns of the list of accounts. The pattern may include one or more parameters selected from usage rates, location of the device from which the account accesses the application, IP addresses, deviations from standard usage in the application and the like. The deviation may be defined by a location in which the account is accessed, for example country/region/city/IP address different than usual. The deviation may be defined by a time that is different than usual usage. The deviation may be defined by accessing a first account without accessing or without correlation of another account of the same entity.

Step 440 discloses identifying an abnormal behavior of a specific account that belong to the specific entity versus other accounts that belong to the specific entity. The abnormal behavior may be computed when the difference between vectors that represent the behavior is higher than a threshold. The vector may be computed using an embedding model that receives text as input, the text being events and/or interactions between the accounts of the specific entity and the corresponding applications. Abnormal behavior may be identified using spatiotemporal analysis.

Abnormal behavior may be defined by accessing the application using the account in a different time than usual or at different time than using the other accounts by the same entity. In some other cases, an entity use a first app only when using a second app. Then, when only the first app is used, this is considered as abnormal behavior and there is a security threat of identity theft.

Step 450 discloses performing a security operation on the account with the abnormal behavior. The security operation may be changing permissions to the account, sending a message to the entity's main contact address, preventing usage for a predefined period of time and the like.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant files and/or records will be developed and the scope of the term file and/or record is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations.

What is claimed is:

1. A method for consolidating accounts in an organization, the method comprises:
collecting, by a processor, a list of accounts used in applications operated by an organization;
identifying, by the processor, clusters of candidates accounts that belong to a specific entity in the organization of a plurality of entities in the organization;
wherein the clusters of candidates accounts are identified by inputting an identifier and metadata;
computing, by the processor, a similarity score between the clusters of the candidates accounts to identify accounts with mutual features that relate to the specific entity;
adding, by the processor, the accounts with mutual features that relate to the specific entity to a list of known accounts that relate to the specific entity;
comparing, by the processor, events performed on computerized applications by a specific account related to the specific entity and events that belong to other accounts relating to the specific entity;
based on comparing the events, detecting a deviation event in which a behavior of one account associated with the specific entity differs from a normal behavior of other accounts of the specific entity; and
preventing by the processor, usage of the one account.

2. The method of claim 1, wherein the specific entity is selected from a group consisting identities, users, persons, services, physical devices, and virtual machines.

3. The method of claim 1, wherein computing the similarity score comprises extracting information about the candidates of accounts by collecting the information from an organizational database.

4. The method of claim 3, wherein the extracting comprises identifying full names of entities in the organization.

5. The method of claim 3, wherein the extracting comprises identifying email prefixes of entities in the organization.

6. The method of claim 1, wherein computing the similarity score is performed using a computerized language model.

7. The method of claim 1, wherein in case the accounts with mutual features relate to multiple entities in the organization, the method further comprises merging the multiple entities into one entity.

8. The method of claim 1, wherein in case the accounts in the clusters of candidates accounts do not relate to a single entity in the organization, the method further comprises adding a new entity in the organization's database.

9. The method of claim 1, wherein identifying clusters of candidates accounts is performed by a technique selected from K-means, alphabetic edit distance, distance between strings and a combination thereof.

10. The method of claim 1, wherein the deviation event is defined according to a location of accessing the account.

11. The method of claim 1, wherein the deviation event is defined according to a time of accessing the account.

12. The method of claim 1, wherein the deviation event is defined according to using a first account not correlated with activity in another account of the entity.

13. The method of claim 1, further comprises identifying activity of accounts that belong to a former employee in the organization.

14. The method of claim 13, further comprises identifying that a former employee of the organization has access to active accounts of the organization.

* * * * *